United States Patent
Charbonneau-Lefort et al.

(10) Patent No.: US 9,225,423 B1
(45) Date of Patent: Dec. 29, 2015

(54) OPTICAL ENGINES AND OPTICAL CABLE ASSEMBLIES CAPABLE OF LOW-SPEED AND HIGH-SPEED OPTICAL COMMUNICATION

(71) Applicant: CORNING OPTICAL COMMUNICATIONS LLC, Hickory, NC (US)

(72) Inventors: Mathieu Charbonneau-Lefort, San Jose, CA (US); William Richard Trutna, Atherton, CA (US); Richard Clayton Walker, Palo Alto, CA (US); Michael John Yadlowsky, Sunnyvale, CA (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 0 days.

(21) Appl. No.: 14/331,517

(22) Filed: Jul. 15, 2014

(51) Int. Cl.
- H04B 10/40 (2013.01)
- H04J 14/00 (2006.01)
- H04B 10/06 (2006.01)
- H04B 10/2575 (2013.01)

(52) U.S. Cl.
CPC ............ *H04B 10/2575* (2013.01); *H04B 10/40* (2013.01)

(58) Field of Classification Search
CPC .......................... H04B 10/2575; H04B 10/40
USPC ................................................... 398/115, 116
See application file for complete search history.

(56) References Cited

U.S. PATENT DOCUMENTS

| | | | | |
|---|---|---|---|---|
| 7,200,336 B2* | 4/2007 | Yu | ........................ | G02B 6/4277 398/135 |
| 8,638,838 B1* | 1/2014 | Betts | ........................ | H04L 5/16 326/30 |
| 2001/0009553 A1* | 7/2001 | Homann | ................ | H04L 49/351 370/445 |
| 2004/0105410 A1* | 6/2004 | Fujimori | ............ | H03H 11/1291 370/335 |
| 2005/0213982 A1* | 9/2005 | Weber | ................... | H04B 10/801 398/135 |
| 2007/0230966 A1* | 10/2007 | Walsh | ................... | H04L 7/0075 398/155 |
| 2007/0269217 A1* | 11/2007 | Yu | .......................... | H04B 10/40 398/137 |
| 2008/0050116 A1* | 2/2008 | Nakaishi | ............... | H04J 3/0682 398/43 |
| 2008/0063395 A1* | 3/2008 | Royle | .................... | H04B 10/40 398/16 |
| 2010/0115295 A1* | 5/2010 | Diab | ....................... | H04L 12/12 713/300 |
| 2010/0221001 A1* | 9/2010 | Duan | ........................ | H04J 3/14 398/45 |
| 2011/0293283 A1* | 12/2011 | Dong | ................... | H04B 10/693 398/135 |
| 2014/0006652 A1* | 1/2014 | Chen | .................... | G06F 11/3051 710/16 |

FOREIGN PATENT DOCUMENTS

| | | | | |
|---|---|---|---|---|
| JP | 2013-137479 A | 7/2013 | ............... | G02B 6/42 |
| WO | WO2013/147816 A1 | 10/2013 | ............... | G02B 6/38 |

\* cited by examiner

Primary Examiner — Oommen Jacob (57) ABSTRACT

Optical engines and optical cable assemblies incorporating optical engines capable of transmitting low-speed and high-speed signals over the same optical fibers are disclosed. In one embodiment, an optical engine includes a low-speed transmit (Tx) line, a low-speed receive (Rx) line, a high-speed data lane, an optical transceiver device, and a control circuit. The high-speed data lane includes a high-speed Tx lane and a high-speed Rx lane. A high-speed signal present on the high-speed Tx lane is converted to a high-speed optical signal at an optical Tx lane, and a high-speed optical signal received at an optical Rx lane is converted to a high-speed signal that is provided to the high-speed Rx lane. The control circuit selectively routes the low-speed Tx signal at the low-speed Tx line directly to the optical transceiver device in real time, and also routes a low-speed Rx signal from the transceiver to the low-speed Rx line.

25 Claims, 6 Drawing Sheets

OPTICAL ENGINES AND OPTICAL CABLE ASSEMBLIES CAPABLE OF LOW-SPEED AND HIGH-SPEED OPTICAL COMMUNICATION

BACKGROUND

1. Field

The present disclosure generally relates to optical communication and, more particularly, to optical communication of relatively low-speed data signals and relatively high-speed data signals over the same optical fibers.

2. Technical Background

As the data rate of communication protocols increases, it becomes difficult to transmit signals using purely electrical cables. Optical communication has provided a solution to the distance versus data rate problem for the telecommunication and data center markets. Benefits of optical fiber include longer reach, extremely wide bandwidth, low noise operation. Because of these advantages, optical fiber is increasingly being used for a variety of applications, including, but not limited to, broadband voice, video, and data transmission. Optical fiber is emerging as the lowest cost and most compact interconnect technology in an increasing number of consumer electronics applications, especially at lengths greater than a few meters.

Some data transmission interfaces require low-speed data (e.g., control data at data rates such as 1 Mb/s) to be transmitted simultaneously with high-speed data (e.g., 10 Gb/s and beyond). However, the additional low-speed data require an additional transmission medium, such as copper conductors or additional optical fibers. The additional transmission medium may increase the diameter of the optical cable, and, in the case of copper conductors, require DC isolation between ends of the optical cable as well as provide additional shielding requirements due to electro-magnetic interference concerns. Further, intercepting and retransmitting low-speed data over optical fibers may be costly due to the strict timing requirements placed on the microcontroller by the communication protocol. Additional optical fibers for low-speed transmission may increase the cost of the optical cable.

SUMMARY

Embodiments of the present disclosure are directed to transmission of high-speed data and low-speed data across one or more optical fibers without the need for additional optical fibers or bulky electrical conductors. More specifically, embodiments are directed to optical engines and optical cable assemblies incorporating optical engines that are capable of optically communicating both relatively low-speed data signals and relatively high-speed data signals over optical fibers without the need for additional transmission medium for the low-speed data signals, and without the complication of receiving and resending the low-speed data signals.

In one embodiment, an optical engine includes a low-speed transmit (Tx) line, a low-speed receive (Rx) line, a high-speed data lane, an optical transceiver device, and a control circuit. A low-speed Tx signal is transmitted on the low-speed Tx line, and a low-speed Rx signal is received on the low-speed Rx line. The high-speed data lane includes a high-speed Tx lane and a high-speed Rx lane. A high-speed Tx signal is transmitted as an electrical signal on the high-speed Tx lane, and a high-speed Rx signal is received as an electrical signal on the high-speed Rx lane. The high-speed Tx signal and the high-speed Rx signal are transmitted and received at a higher data transfer rate than the low-speed Tx signal and the low-speed Rx signal. The optical transceiver device includes an optical Tx lane and an optical Rx lane. The high-speed data lane is coupled to the optical transceiver device such that high-speed signal present on the high-speed Tx lane is converted to a high-speed optical signal at the optical Tx lane, and a high-speed optical signal received at the optical Rx lane is converted to a high-speed signal that is provided to the high-speed Rx lane. The control circuit is positioned between the low-speed Tx line and the low-speed Rx line and the optical transceiver device. The control circuit is electrically coupled to the optical transceiver device and is configured such that the control circuit selectively routes the low-speed Tx signal at the low-speed Tx line directly to the optical transceiver device in real time such that the optical transceiver device converts the low-speed Tx signal to a low-speed optical Tx signal at the optical Tx lane.

In another embodiment, an optical engine includes a low-speed Tx line, a low-speed Rx line, a high-speed data lane, an optical transceiver device, and a means for selectively routing the low-speed Tx signal at the low-speed Tx line directly to the optical transceiver device in real time. A low-speed Tx signal is transmitted on the low-speed Tx line, and a low-speed Rx signal is received on the low-speed Rx line. The high-speed data lane includes a high-speed Tx lane and a high-speed Rx lane. A high-speed Tx signal is transmitted as an electrical signal on the high-speed Tx lane, and a high-speed Rx signal is received as an electrical signal on the high-speed Rx lane. The high-speed Tx signal and the high-speed Rx signal are transmitted and received at a higher data transfer rate than the low-speed Tx signal and the low-speed Rx signal. The optical transceiver device includes an optical Tx lane and an optical Rx lane. The high-speed data lane is coupled to the optical transceiver device such that high-speed signal present on the high-speed Tx lane is converted to a high-speed optical signal at the optical Tx lane, and a high-speed optical signal received at the optical Rx lane is converted to a high-speed signal that is provided to the high-speed Rx lane.

In yet another embodiment, an optical cable assembly includes an optical cable having a first end and a second end, a first electrical connector assembly disposed at the first end of the optical cable, and a second electrical connector assembly disposed at the second end of the optical cable. The optical cable includes a plurality of optical fibers. Each of the first electrical connector assembly and the second electrical connector assembly includes a housing and an optical engine disposed within the housing. The optical engine includes, a low-speed Tx line, a low-speed Rx line, a high-speed data lane, an optical transceiver device, and a control circuit. A low-speed Tx signal is transmitted on the low-speed Tx line and a low-speed Rx signal is received on the low-speed Rx line. The high-speed data lane includes a high-speed Tx lane and a high-speed Rx lane. A high-speed Tx signal is transmitted as an electrical signal on the high-speed Tx lane, and a high-speed Rx signal is received as an electrical signal on the high-speed Rx lane. The high-speed Tx signal and the high-speed Rx signal are transmitted and received at a higher data transfer rate than the low-speed Tx signal and the low-speed Rx signal. Then optical transceiver device includes an optical Tx lane optically coupled to an individual one of the plurality of optical fibers and an optical Rx lane coupled to an individual one of the plurality of optical fibers. The high-speed data lane is coupled to the optical transceiver device such that high-speed signal present on the high-speed Tx lane is converted to a high-speed optical signal at the optical Tx lane, and a high-speed optical signal received at the optical Rx lane is converted to a high-speed signal that is provided to the high-speed Rx lane. The control circuit is positioned between the low-speed Tx line and the low-speed Rx line and the optical transceiver device. The control circuit is electrically coupled to the optical transceiver device and is configured such that the control circuit selectively routes the low-speed Tx signal at the low-speed Tx line directly to the optical transceiver device in real time such that the optical transceiver device converts the low-speed Tx signal to a low-speed optical Tx signal at the optical Tx lane.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments of the present disclosure are directed to optical engines and optical cable assemblies incorporating optical engines capable of communicating both payload data (provided by high-speed signals) and management/control data (provided by low-speed signals) over optical fibers. The low-speed signals have a data rate that is lower than the high-speed payload data signals. As an example, a high-speed data line or lane is 10× faster than a low-speed line or lane, but other multiples are possible between high-speed data lines or lanes and low-speed data lines or lanes. For instance, the high-speed signal may be 100× or faster than a low-speed signal, and may even be faster. Some communication protocols require transmission of management or control data to maintain the communications link. Such data may include cable manufacture identification number, cable connection status, transmission status, and any other data required by the communication protocol. Embodiments of the present disclosure enable the transmission of low-speed signals representing data such as management/control data over a fiber communications link without additional transmission medium (e.g., copper wires or additional optical fibers) or costly transmission circuitry for receiving and resending the low-speed data. More specifically, embodiments of the present disclosure allow low-speed signals representing management or control data to "pass through" the optical engine within the connector of the optical cable assembly. As used herein, the term "pass-through" means that the low-speed signals are routed directly through the connector without being received and then resent by a microcontroller or other processing component.

Figure 1:
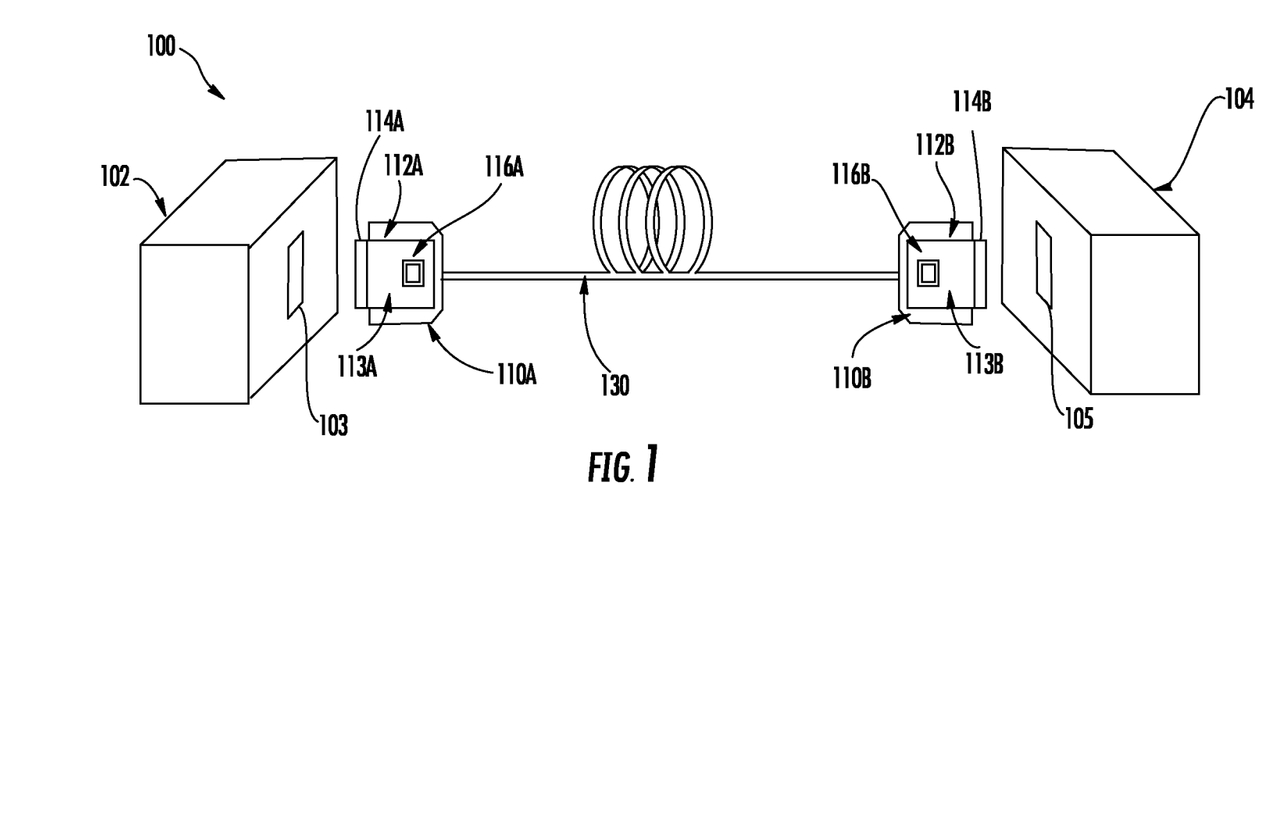
FIG. 1 schematically depicts an example optical cable assembly connected to two electronic devices according to one or more embodiments described and illustrated herein.

Referring now to FIG. 1, an optical cable assembly 100 is schematically illustrated. Generally, the optical cable assembly 100 comprises a first electrical connector 110A at a first end of an optical cable 130 and a second electrical connector 110B at a second end of the optical cable 130. The first and second electrical connectors 110A, 110B include a plug portion 114A, 114B, respectively, having electrical contact that mate with a receptacle 103, 105 of an electronic device 102, 104, respectively. In other embodiments, the first and/or second electrical connectors 110A, 110B are configured as a receptacle for mating with a plug of an electronic device. The electronic devices 102, 104 may be any electronic device including, but not limited to, a server device, a personal computer, an external storage device, a photographic device, a display device, a cellular phone, and a media player.

An optical engine 112A, 112B resides in first and second electrical connectors 110A, 110B of the optical cable assembly 100 that is responsible for realizing the electrical-to-optical conversion and optical-to-electrical conversion. The optical engines 112A, 112B may comprise a printed circuit board assembly 113A, 113B that maintains an optical transceiver device 116A, 116B and other electronic components for electro-optical and opto-electrical conversion.

The optical cable assemblies described herein are active optical cable assemblies in the sense that they actively convert optical and electrical signals within the cable. As described in more detail below, the optical engines 112A, 112B convert high-speed electrical signals (i.e., payload data) into high-speed optical signals inside the first and second electrical connector 110A, 110B, which are transmitted over optical fibers and converted back to the electrical domain inside the electrical connector at the opposite end of the optical cable assembly 100. The optical engines 112A, 112B further include an optional optical module (not shown) to couple the light (i.e., an optical signal) in and out of optical fibers within the optical cable 130. Active optical cables are attractive for many consumer applications because they provide familiar tested electrical interfaces while providing the optical transport advantages of optical fiber communication.

As stated above, embodiments of the present disclosure may utilize any communications protocol where low-speed control data is sent in addition to high-speed payload data. For example, interconnects may include two bi-directional high-speed lanes with a separate bi-directional low-speed channel to manage the state of the communications link provided by a cable assembly. Concepts described herein may be utilized in any application wherein a communications protocol requires low-speed data transmission in addition to high-speed payload data transmission.

Figure 2:
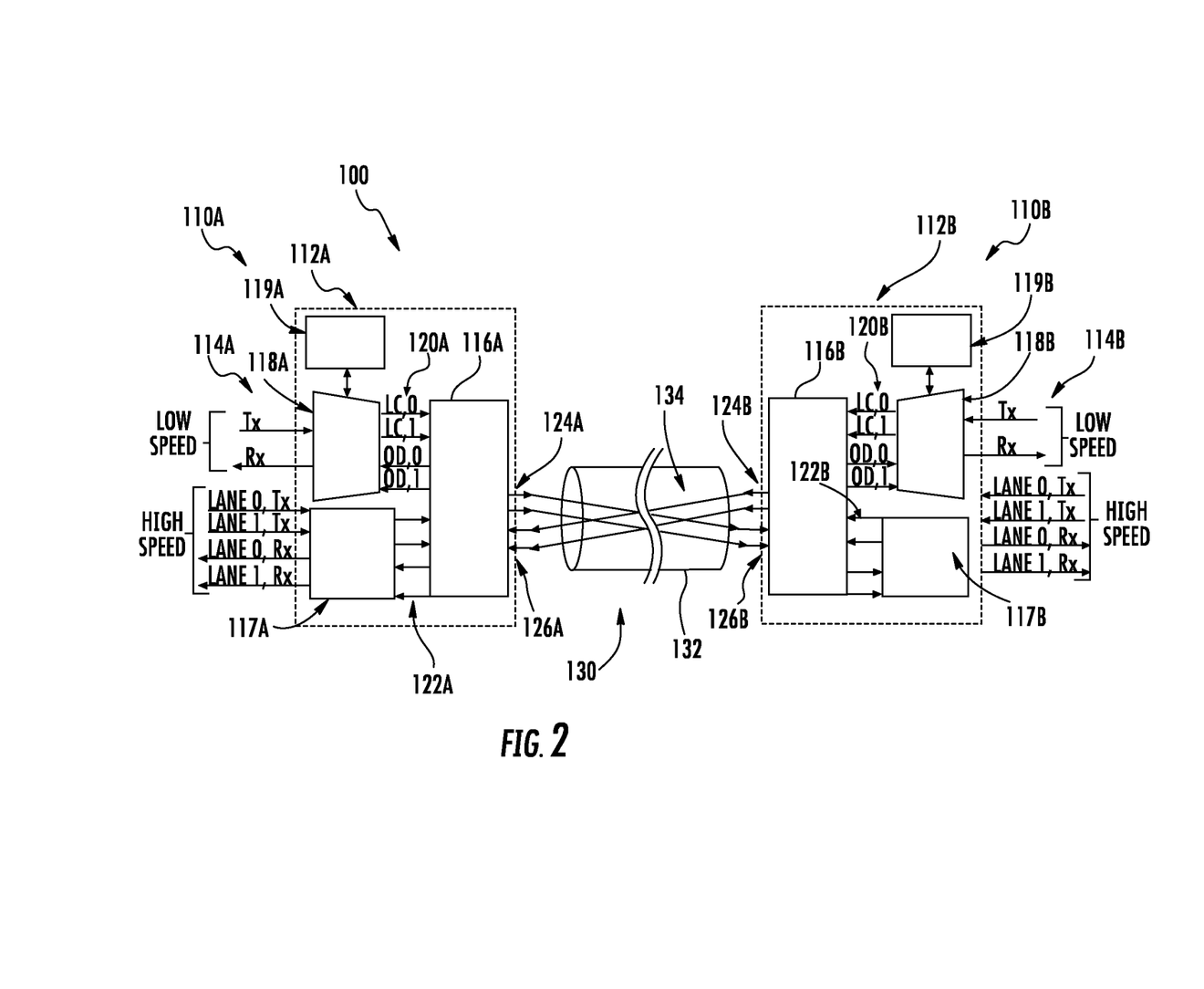
FIG. 2 schematically depicts optical engines within electrical connectors of an optical cable assembly according to one or more embodiments described and illustrated herein.

Referring now to FIG. 2, the optical cable assembly 100 is schematically illustrated in greater detail. Each electrical connector 110A, 110B includes a plug portion 114A, 114B providing electrical contacts for two high-speed Tx lanes (lane 0 Tx and lane 1 Tx), two high-speed Rx lanes (lane 0 Rx and lane 1 Rx), a low-speed Tx line and a low-speed Tx line. Lane 0 is a first high-speed data lane while lane 1 is a second high-speed data lane. It should be understood that any number of high-speed data lanes may be used.

The optical engine 112A, 112B includes an optical transceiver device 116A, 116B, a microcontroller 119A, 119B, and a control circuit for routing low-speed signals as described in detail below. In some embodiments, a signal conditioning circuit 117A, 117B may be provided to condition the high-speed signals on high-speed lanes 1 and 0. The signal conditioning circuit 117A, 117B may provide functionality such as retiming, equalization, pre-emphasis, de-emphasis, and the like. The conditioned signals may then be passed to the optical transceiver device 116A, 116B by high-speed inputs and outputs 122A, 122B (i.e., high-speed data lanes).

The optical transceiver device 116A, 116B comprises both optical transmitters and receivers. Typically, the transmitters are vertical-cavity surface-emitting lasers (VCSELs) and the receivers are photodiodes. The lasers are driven by a laser driver integrated circuit ("IC"), and the signal generated by the photodiodes is amplified using a trans-impedance amplifier ("TIA"), typically followed by a limiting amplifier. In some embodiments, both transmit and receive functions of the optical transceiver device 116A, 116B are integrated in a single transceiver IC. In other embodiments, the transmit function and the receive function are provided in separate ICs. Laser driver ICs typically have "laser control" ("LC") pins that turns on each laser, and TIAs provide "optical detect" ("OD") signals indicating that light is being received by a photodiode.

In the illustrated embodiment, the control circuit 118A, 118B is electrically coupled to the microcontroller 119A, 119B, as well as to the optical transceiver device 116A, 116B by inputs/outputs 120A, 120B. The inputs/outputs 120A, 120B of the illustrated embodiment include a first laser control pin (labeled as "LC, 0" in FIG. 2), a second laser control pin (labeled as "LC, 1" in FIG. 2), a first optical detect pin (labeled as "OD, 0" in FIG. 2) and a second optical detect pin (labeled as "OD, 1" in FIG. 2). Other embodiments may include more or fewer laser control pins and/or optical detect pins.

The optical transceiver device 116A, 116B has optical outputs 124A, 124B (i.e., optical Tx lanes) and optical inputs 126A, 126B (i.e., optical Rx lanes) for lane 0 and lane 1. Each optical output 124A, 124B and optical input 126A, 126B is optically coupled to an optical fiber 134 within an outer jacket 132 of the optical cable 130. Both high-speed signals and low-speed signals are communicated between ends of the optical cable assembly 100 over the optical fibers 134.

Rather than providing additional transmission medium (e.g., copper wires or optical fibers) for the low-speed signals representing low-speed data (e.g., management data or control data), or receiving and resending low-speed data (which may be costly due to the timing requirements of the particular protocol), embodiments of the present disclosure let the low-speed data travel without digital modification to and from the optical transceiver device 116A, 116B by using the control circuit 118A, 118B to route the low-speed signals representing the low-speed data. As a result, the microcontroller 119A, 119B does not need to meet the same tight timing requirements as the receiving and resending method. The microcontroller 119 only has to route the traffic over the desired lane, and to carry out tasks related to link maintenance, such as blocking low-speed traffic in active mode, or maintaining the link during sleep mode operation. In this manner, embodiments allow the use of a general-purpose, lower-performance microcontroller, and relaxes the timing requirements that the microcontroller has to satisfy.

As described in more detail below, the on-board microcontroller 119A, 119B listens to data packets (low-speed and/or high-speed data packets), interprets them and configures the control circuit 118A, 118B to reflect the state of the communications link provided by the optical cable assembly 100.

In this manner, the control circuit 118A, 118B selectively routes low-speed signals (either low-speed Tx signals on the low-speed Tx line or an on-board Tx signal from the microcontroller 119A, 119B) to one of the laser control pins of the optical transceiver device 116A, 116B in real time. As used herein, "real time" means that the signals are not intercepted and then re-sent by a microcontroller, which causes a delay. The optical transceiver device 116A, 116B converts the low-speed signal received at the laser control pin into an optical signal that is sent over one of the optical fibers 134.

The control circuit 118A, 118B also selectively routes low-speed Rx signals converted from low-speed optical Rx signals by the optical transceiver device 116A, 116B to the microcontroller 119A, 119B or the low-speed Rx line depending on the state of the communication link. Further, the control circuit 118A, 118B may also selectively route a low-speed signal from the microcontroller 119A, 119B (i.e., an on-board Tx signal) to the low-speed Rx line.

Figure 3:
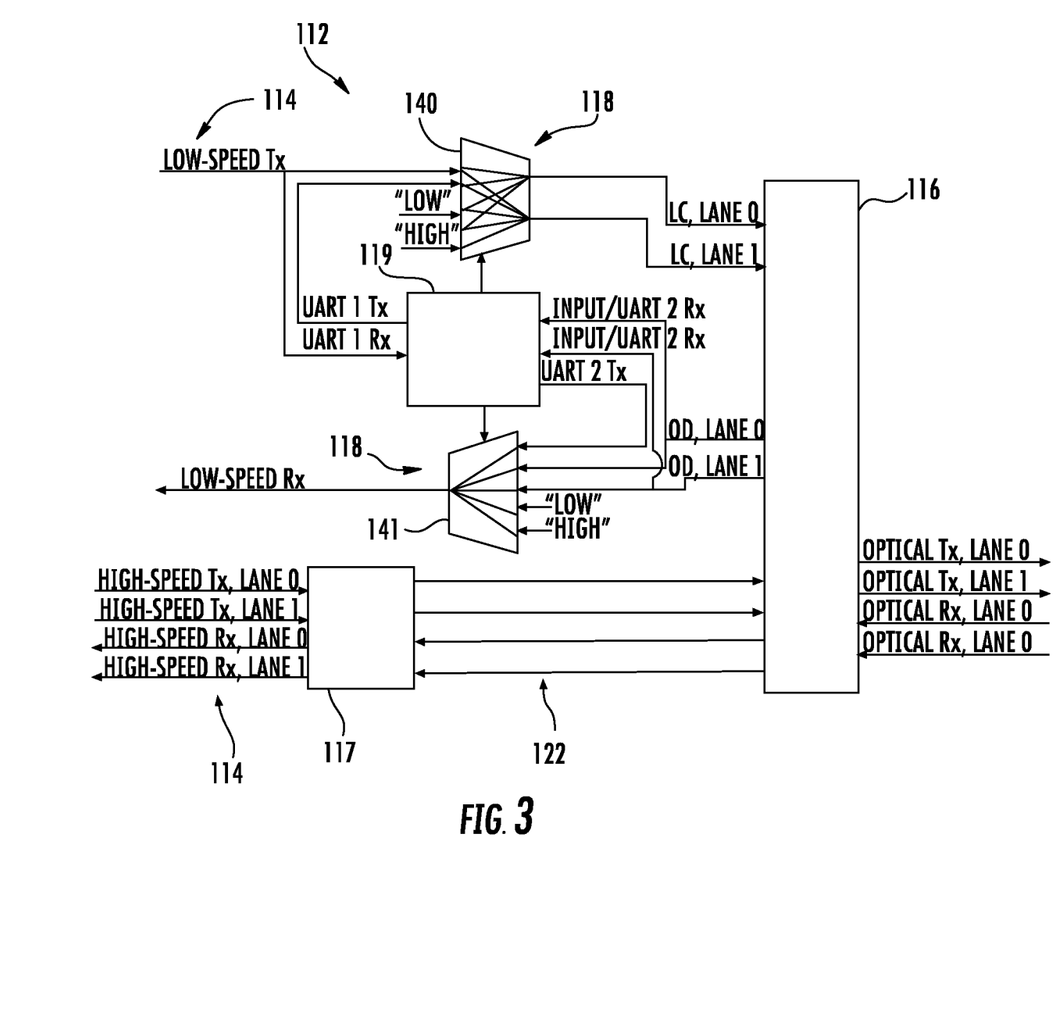
FIG. 3 schematically depicts an example optical engine incorporating multiplexers according to one or more embodiments described and illustrated herein.

FIG. 3 schematically depicts an optical engine 112 within an electrical connector of an optical cable assembly. It is noted that FIG. 3 only depicts components of one end of an optical cable assembly for ease of illustration and description. For example, the optical engine 112 and its components depicted in FIG. 3 may apply to the optical engines 112A, 112B and other components depicted in FIGS. 1 and 2.

More specifically, FIG. 3 schematically depicts an example microcontroller 119 and example control circuit 118 in greater detail. Generally, the control circuit 118 provides a circuit architecture for link management and control signals (relatively low-speed signals) and payload (relatively high-speed signals) traffic over the same set of optical fibers 134 (see FIG. 2). This architecture lets the data travel uninterrupted to and from the laser driver and trans-impedance amplifier of the optical transceiver device 116, by routing the traffic instead of intercepting and re-transmitting the packets.

The control circuit 118 is provided to connect the management signals from the connected electronic device on the low-speed Tx and Rx lines, or the on-board Tx and Rx signals provided by the microcontroller 119 to the inputs and outputs of the optical transceiver device 116. Microcontrollers 119 in each end of the optical cable assembly 100 monitor the control signals and drive the control circuit 118.

The illustrated microcontroller 119 has two universal asynchronous receiver transmitter ("UART") ports providing serial transmit pins and serial receive pins. The transmit pins of the two UART ports are labeled as UART 1 Tx and UART 2 Tx, while the receive pins of the two UART ports are labeled as UART 1 Rx and UART 2 Rx. It should be understood that the microcontroller 119 may include more than two UART ports. As shown in FIG. 3, two pins of the microcontroller 119 may be configured as input ports.

The optical transceiver device 116 receives low- or high-speed modulation signals and generates the appropriate electrical signals to control the optical transmitter, which in one embodiment is configured as a VCSEL. In the example embodiment, the laser control pins ("LC, lane 0" or "LC, lane 1") of the transceiver are driven high to turn the VCSELs on and low to turn them off for low speed transmission. For high-speed transmission, the laser control pin is held high while the high-speed data signals determine the modulation of the laser.

Similarly, the optical transceiver device 116 detects low and high speed modulation of the received optical signal. It drives the optical detect pins ("OD, lane 0" and "OD, lane 1") high when light is received by the photodiodes and low otherwise. Accordingly, the optical detect pins are used to receive low-speed optical Rx signals in the current example.

The control circuit 118 may be divided into two groups. The transmit path provides an interface between the low-speed Tx line and the laser control pins which control the VCSELs of the optical transceiver device 116, while the receive path connects the optical detect pins reflecting the state of the photodiodes to the low-speed Rx line.

In the illustrated embodiment, the control circuit 118 is defined by a 4-to-2 multiplexer 140 on the transmit path and a 5-to-1 multiplexer on the receive path. Signal routing options and examples of typical use cases of the circuit depicted in FIG. 3 are provided in Table 1.

TABLE 1

| State | Function | Example implementation: Signal routed to either laser control (LC) pin |
|---|---|---|
| Transmit low-speed transmit traffic over either fiber | Transmit low-speed traffic over whichever fiber is not used to carry high-speed data | Low-speed Tx |
| Allow on-board microcontroller to transmit over either fiber | Re-transmit packets to far-end; transmit intra-cable packets | UART 1 Tx |
| Turn either or both VCSEL off | Intra-cable signaling; sleep mode | "Low" |
| Turn either or both VCSEL on | Enable transmission of high-speed data; intra-cable signaling; sleep mode | "High" |

It is noted that "Low" or "High" in Table 1 mean that the voltage is held low or high, respectively. Referring to both Table 1 and FIG. 3, the microcontroller 119 controls the 4-to-2 multiplexer 140 to route the low-speed Tx signal present on the low-speed Tx line to either laser control pins LC, lane 0 or LC, lane 1. For example, one of the optical Tx lanes and fibers may be communicating high-speed payload data signals. In this case, the microcontroller 119 may control the 4-to-2 multiplexer 140 to route the low-speed Tx signal to the laser control pin associated with the idle optical Tx lane and fiber.

UART 1 Tx is an on-board Tx signal provided by the microcontroller 119. UART 1 Tx may be used to allow the microcontroller 119 to transmit its own data to the opposite end of the optical cable assembly. For example, the microcontroller 119 may need to send a sleep signal to the opposite end of the optical cable assembly, or send other intra-cable messages. The microcontroller 119 may control the 4-to-2 multiplexer to connect UART 1 Tx to either laser control pins LC, lane 0 or LC, lane 1 depending on which optical lane is not being used to transmit high-speed payload data signals.

The "Low" and "High" inputs are used to fix either laser control pin high or low depending on the state of the optical cable assembly, e.g., to provide a sleep mode operation, provide intra-cable signaling, enable or disable transmission of high-speed payload data signals, and the like.

On the receive path, the control circuit 118 is provided as a 5-to-1 multiplexer 141. Signal routing options and examples of typical use cases are listed in Table 2.

TABLE 2

| State | Function | Signal routed to low-speed Rx pin |
|---|---|---|
| Receive low-speed transmit traffic from either fiber | Receive low-speed traffic from whichever fiber is not used to carry high-speed data | OD, lane 0 or OD, lane 1 |
| Allow on-board microcontroller to transmit to near-end host or device | Communication to near-end host or device; loading firmware | UART 2 Tx |
| Hold the low-speed receive lane low | Intra-cable signaling; sleep mode | "Low" |
| Hold the low-speed receive lane low | Intra-cable signaling; sleep mode | "High" |

Tables 1 and 2 list various use cases where the functions provided by the control circuit 118 are desired. As stated above, one role of the control circuit 118 is to route the low-speed traffic (low-speed Tx signal or on-board Tx signal) to and from whichever fiber is not used to transport high-speed data. VCSELs used to transmit high-speed data are enabled by holding their laser-enable pin high.

If both optical fibers are being used for high-speed payload data, then low-speed data should not be transmitted as it would interrupt the high-speed traffic. Low-speed modulation of a lane used to carry high-speed data might be necessary however when de-provisioning the communications link provided by the optical cable assembly.

As stated above, it may be desirable to allow the on-board microcontroller 119 to send low-speed packets (i.e., on-board Tx signals) over the optical fibers to the other end of the optical cable assembly; this is done by routing the UART 1 Tx to either laser control pin. If these packets are intended to be sent to the far-end host or device, then the correct optical detect pin should be routed to the low-speed Rx line. However, if these are intra-cable packets (that is, intended to be sent to the far end on-board microcontroller but not the connected electronic device), then they should not be allowed to be transmitted to the far-end host or electronic device, which is accomplished by holding the low-speed Rx line high or low, depending on the state of the link.

In some cases, it may be desirable to allow the on-board microcontroller 119 to communicate with the near-end host or electronic device to which the optical cable assembly is connected. In this case, the microcontroller 119 may control the 5-to-1 multiplexer 141 to connect the UART 2 Tx pin of the microcontroller 119 to the low-speed Rx line.

In other cases, it may be desirable to issue simpler intra-cable signals to the other end of the optical cable assembly by turning either VCSEL on or off. In this case, these simple signals should be isolated from the far-end host or electronic device, again by controlling the state of the low-speed Rx line. Finally, in sleep mode operation it may be desirable to turn off the lasers or to issue pulses of light while holding the low-speed Rx line high or low depending on the state of the communications link.

In the illustrated embodiment, the UART 1 Rx pin of the microcontroller 119 is connected to the low-speed Tx line. This configuration allows the microcontroller 119 to monitor the low-speed traffic such that it is aware of the state of the communications link. Therefore, the microcontroller 119 may read the low-speed Tx signals that are transmitted. In some embodiments, the low-speed data provided by the low-speed Tx signals are stored within the microcontroller 119 for retransmission over the optical fibers using the UART 1 Tx pin (e.g., if both optical Tx lanes are busy with high-speed payload data transmission).

The microcontroller 119 is also coupled to the optical detect pins OD, lane 0 and OD, lane 1 such that it may sense the state of both optical detect signals in order to detect the presence of light on the photodiodes. The arrows between the microcontroller 119 and each multiplexer 140, 141 represent the control signals required to configure the state of the multiplexers.

There are many ways of implementing the control circuit 118 depicted in FIG. 2 and the multiplexer functionality depicted in FIG. 3. In some embodiments, both lasers of optical Tx, lane 0 and optical Tx, lane 1 on at all times except during sleep mode operation. This configuration provides for the following consequences: (1) either lane may be used at any time to carry high-speed data without modifying the state of the control circuit; (2) the low-speed Tx and Rx signals may be connected directly to the laser control pins and from the optical detect pins without the need to invert the signal because RS232 protocol used for low-speed signaling is idle high; and (3) on the receive path, the low-speed traffic can be obtained by combining the signals from both optical detect pins OD, lane 0 and OD, lane 1 using an AND gate, regardless of which fiber is used to carry the low-speed traffic.

Figure 4:
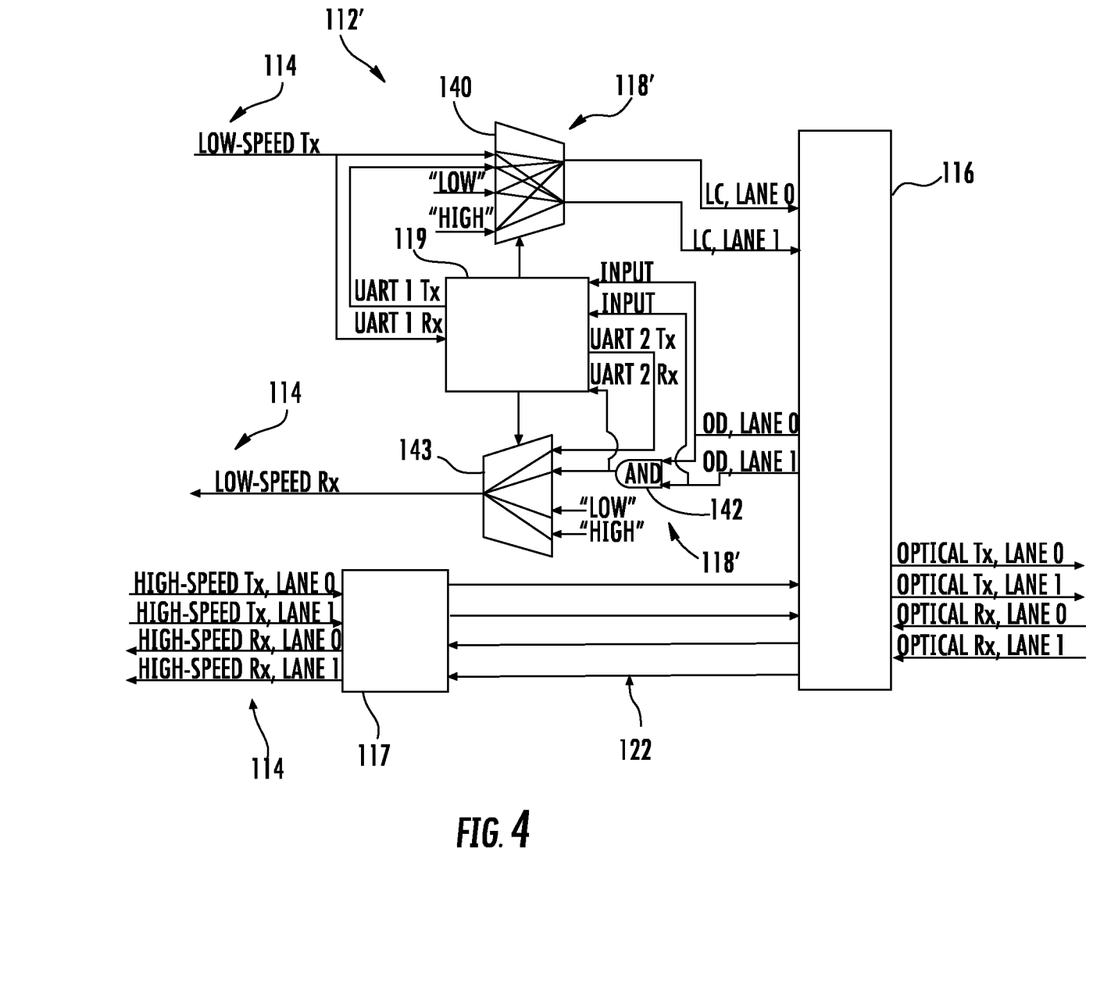
FIG. 4 schematically depicts an example optical engine incorporating an AND gate at the optical detect pins of an optical transceiver device and includes two multiplexers according to one or more embodiments described and illustrated herein.

Consequence number (3) above provides simplification of the design, because it relieves the on-board microcontroller 119 from having to decide which optical detect signal (i.e., OD, lane 0 or OD, lane 1) needs to be routed to the low-speed Rx line, thereby simplifying the management of the communications link. FIG. 4 schematically depicts an optical engine 112' having a control circuit 118' that includes an AND gate 142 with inputs coupled to OD, lane 0 and OD, lane 1. The output of the AND gate 142 is provided as an input to a 4-to-1 multiplexer 143 (as opposed to the 5-to-1 multiplexer depicted in the example embodiment of FIG. 3). Otherwise, the example embodiment of FIG. 4 incorporating the AND gate 142 is the same as the example depicted in FIG. 3.

Figure 5:
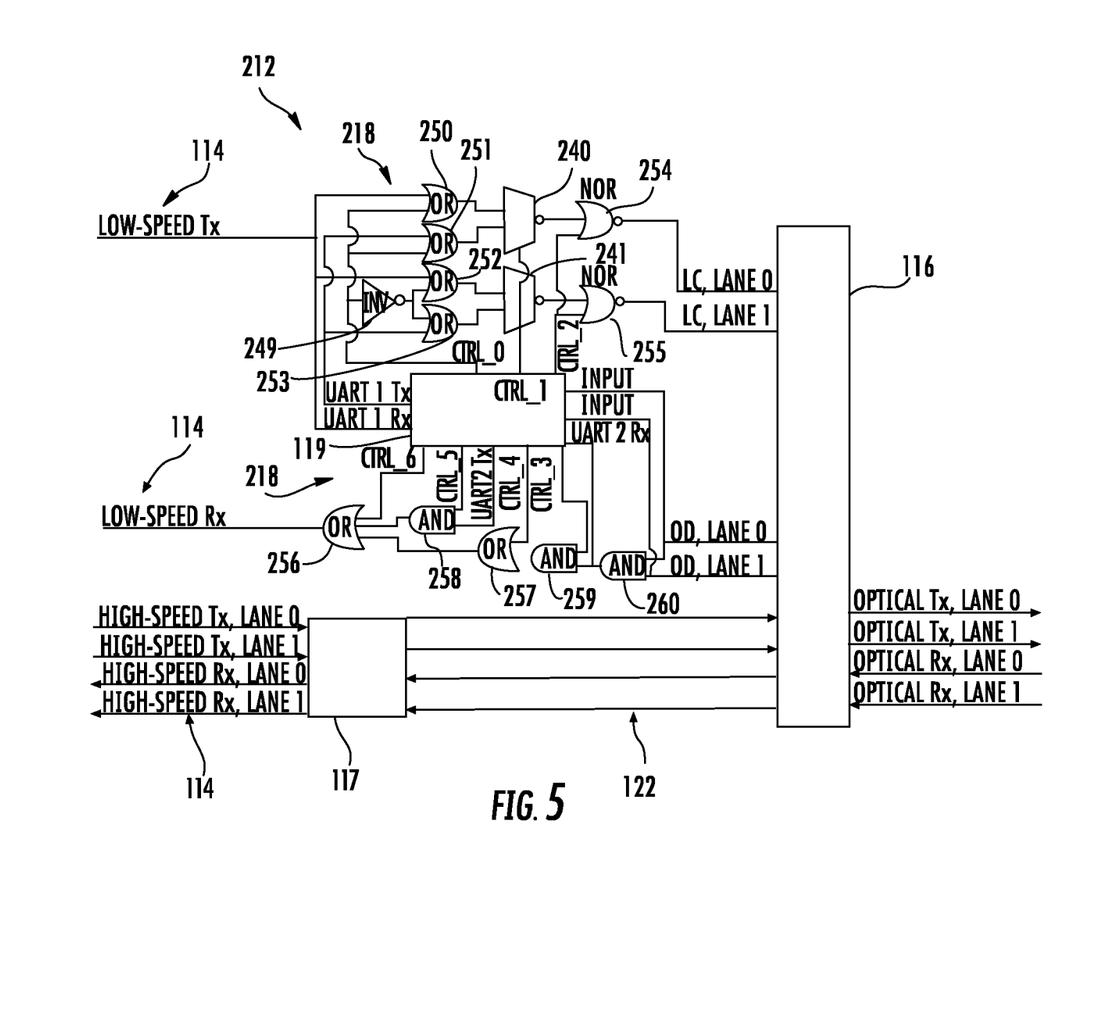
FIG. 5 schematically depicts an example optical engine according to one or more embodiments described and illustrated herein.

Even with the design choice incorporating the AND gate 142 illustrated in FIG. 4, there are many ways of arranging electrical components to realize the functions listed in Tables 1 and 2. FIG. 5 schematically depicts another example optical engine 212 having a control circuit 118 for providing the functions listed in Tables 1 and 2. It should be understood that other components and arrangement of components may be utilized.

Like the example optical engines depicted in FIGS. 3 and 4, the microcontroller 119 of the example optical engine 212 includes a UART 1 Tx pin, a UART 1 Rx pin, a UART 2 Tx pin, a UART 2 Rx, and two inputs connected to OD, lane 0 and OD, lane 1. The microcontroller 119 further comprises the following output pins: Ctrl_0, Ctrl_1, Ctrl_2, Ctrl_3, Ctrl_4, and Ctrl_5. These outputs are provided to the control circuit 218 to route the low-speed data signals as described above and listed in Table 3 below.

First, the components and operation of the transmit path depicted in FIG. 5 will be described. The transmit path of the example control circuit 218 includes four OR gates 250-253 and an inverter 249. The low-speed Tx line is provided as an input to OR gate 250 and OR gate 252. UART 1 Tx is provided as an input to OR gate 251 and OR gate 253. The Ctrl_0 pin is provided as a selector between the low-speed Tx line and UART 1 Tx. The Ctrl_0 pin is provided as an input to OR gate 250 and OR gate 251, and as an input for inverter 249. The output of inverter 249 is provided as an input to OR gate 252 and OR gate 253. Therefore, when the Ctrl_0 pin is driven high, a logical one is provided to OR gates 250 and 251, while a logical zero is provided to OR gates 250 and 251. The opposite is true when the Ctrl_0 pin is driven low. Referring to Table 3 below, when Ctrl_0 is driven low, the low-speed Tx line is connected to either LC, lane 0 or LC, lane 1. When Ctrl_0 is driven high, UART 1 Tx is connected to either LC, lane 0 or LC, lane 1.

TABLE 3

| Transmit path | | | | | |
|---|---|---|---|---|---|
| | Signal routed to VCSELs | | Control signals | | |
| State | LC, lane 0 | LC, lane 1 | Ctrl_0 | Ctrl_1 | Ctrl_2 |
| Route low-speed traffic over lane 0 | Low-speed Tx | 1 | 0 | 0 | 0 |
| Route low-speed traffic over lane 1 | 1 | Low-speed Tx | 1 | 0 | 0 |
| Transmit over lane 0/turn both lasers on | UART 1 Tx | 1 | 0 | 1 | 0 |
| Transmit over lane 1/turn both lasers on | 1 | UART 1 Tx | 1 | 1 | 0 |
| Turn both lasers off | 0 | 0 | X | X | 1 |

| Receive path | | | | |
|---|---|---|---|---|
| | Signal routed to low- | Control signals | | |
| State | speed Rx | Ctrl_3 | Ctrl_4 Ctrl_5 Ctrl_6 | |
| Route traffic from either photodiode to low-speed Rx | OD, lane 0 AND OD, lane 1 | 1 | 0 0 | 0 |
| Transmit over low-speed Rx | UART 2 Tx | 0 | 0 1 | 0 |
| Hold low-speed Rx low | 0 | 0 | 0 0 | 0 |
| Hold low-speed Rx high | 1 | X | X X | 1 |

The example transmit path includes a first 2-to-1 multiplexer 240 and a second 2-to-1 multiplexer 241. The outputs of OR gates 250-253 are provided as inputs to the first and second multiplexers 240 and 241. Both the first and second multiplexers 240, 241 have inverted outputs which are provided as inputs to NOR gate 254 and NOR gate 255, respectively. The output of NOR gate 254 is coupled to LC, lane 0 of the optical transceiver device 116, and the output of NOR gate 255 is coupled to LC, lane 1 of the optical transceiver device 116. The Ctrl_2 pin is also provided as an input to NOR gates 254 and 255.

The Ctrl_1 pin is connected to both the first and second multiplexers 240, 241, and is used to select which input to the first and second multiplexers 240, 241 (i.e., low-speed Tx line or UART 1 Tx) is connected to LC, lane 0 or LC, lane 1, respectively, as shown in Table 3 above. When the Ctrl_2 pin is driven high, the NOR gates 254 and 255 produce a logical low output, which turns off both lasers that are driven by LC, lane 0 and LC, lane 1.

The receive path of the example control circuit 118 comprises AND gates 258-260, OR gate 257, and OR gate 256. The optical detect pins OD, lane 0 and OD, lane 1 are provided as inputs to AND gate 260. AND gate 260 functions similarly to AND gate depicted in FIG. 4. Additionally, OD, lane 0 and OD, lane 1 are also connected to two input pins of the microcontroller 119 to provide additional functionality (e.g., counting pulses of light during sleep mode operation).

The output of AND gate 260 is provided as an input to UART 2 Rx. The microcontroller 119 may be programmed to receive intra-cable signals from the far-end of the optical cable assembly (e.g., intra-cable signals provided by a microcontroller of the far-end of the optical cable assembly).

The output of AND gate 260 is also provided as an input to AND gate 259. The Ctrl_3 pin is provided as the other input to AND gate 259. The output of AND gate 259 is provided as a first input to OR gate 257, while Ctrl_4 is provided as a second input to OR gate 257. AND gate 258 receives the Ctrl_5 pin and UART 2 Tx as inputs, while its output is provided as an input to OR gate 256. The output of OR gate 257 is also provided as an input to OR gate 256. The Ctrl_6 pin is provided as a third input to OR gate 256. The output of OR gate 256 is connected to the low-speed Rx line.

Referring to Table 3, the Ctrl_3 pin and the Ctrl_5 pin are used to connect either the low-speed Rx signals from OD, lane 0 and OD, lane 1, or UART 2 Tx to the low-speed Rx line. When the Ctrl_3 pin, the Ctrl_4 pin, the Ctrl_5 pin and the Ctrl_6 pin are driven low, the low-speed Rx line is held low. When the Ctrl_6 pin is driven high, the low-speed Rx line is held high.

Figure 6:
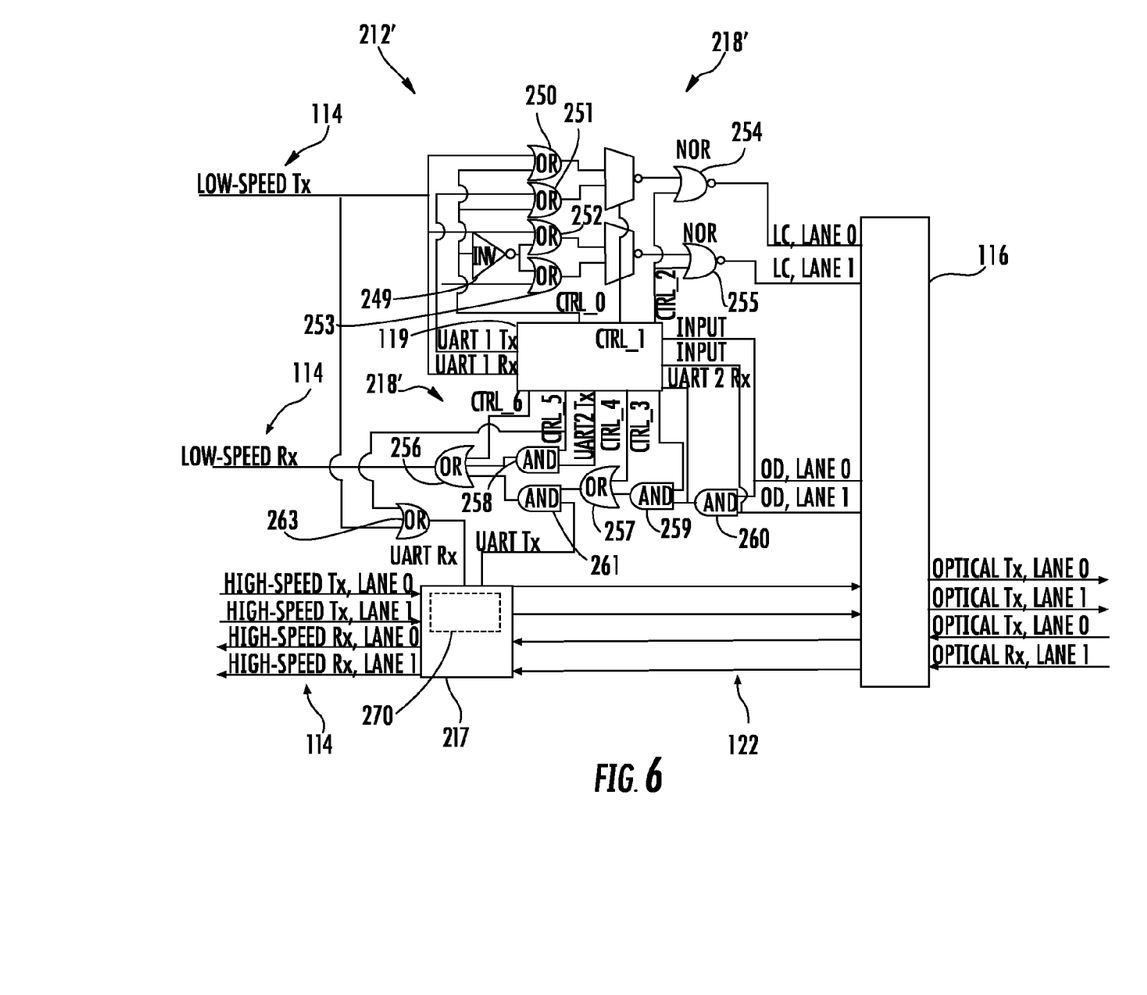
FIG. 6 schematically depicts an example optical engine utilizing two microcontrollers according to one or more embodiments described and illustrated herein.

FIG. 6 depicts yet another example optical engine 212' having a control circuit 218' similar to that depicted in FIG. 5 but where the signal conditioning circuit 217 is configured as a signal conditioning integrated circuit that includes an additional on-board microcontroller 270 that may be utilized to perform some of the on-board communication tasks to manage the four optical lanes as well as manage communication with the near-end host or electronic device.

Generally, it may be advantageous to take advantage of multiple microcontrollers, be they stand-alone or integrated with other ICs, in order to implement division of labor. In the embodiment depicted in FIG. 6, the additional microcontroller 270 is integrated with the signal conditioning circuit 217 IC receives and transmits on the low-speed Rx and Tx lines by UART Tx and UART Rx, while retaining control of what it is able to send and receive. For example, the additional microcontroller 270 should be prevented from receiving requests when the on-board microcontroller 119 needs to transmit to avoid collisions. As an example and not a limitation, UART Tx and UART Rx of the additional microcontroller 270 may be used to respond to frequent requests from the near-end host or electronic device.

More specifically, the control circuit 218' comprises an additional AND gate 261. The Ctrl_5 pin and UART 2 Tx are provided as inputs to AND gate 258 as depicted in FIG. 5. The output of 257 is provided as a first input to AND gate 261, while UART Tx of the additional microcontroller 270 is provided as a second input to AND gate 261. The outputs of AND gate 261 and AND gate 258 are provided as inputs to OR gate 256.

The control circuit 218' further comprises OR gate 263. OR gate 263 receives the low-speed Tx line and Ctrl_5 pin as inputs, while its output is provided to UART Rx of the additional microcontroller 270.

Table 4 below provides a truth table for the schematic depicted in FIG. 6.

TABLE 4

| | Transmit path | | | | |
| --- | --- | --- | --- | --- | --- |
| | Signal routed to VCSELs | | Control signals | | |
| State | LC, lane 0 | LC, lane 1 | Ctrl_0 | Ctrl_1 | Ctrl_2 |
| Route low-speed traffic over lane 0 | Low-speed Tx | 1 | 0 | 0 | 0 |
| Route low-speed traffic over lane 1 | 1 | Low-speed Tx | 1 | 0 | 0 |
| Transmit over lane 0/ turn both lasers on | UART 1 Tx | 1 | 0 | 1 | 0 |
| Transmit over lane 1/ turn both lasers on | 1 | UART 1 Tx | 1 | 1 | 0 |
| Turn both lasers off | 0 | 0 | X | X | 1 |

| | Receive path | | | |
| --- | --- | --- | --- | --- |
| | Signal routed to | Control signals | | |
| State | low-speed Rx | Ctrl_3 | Ctrl_4 Ctrl_5 | Ctrl_6 |
| Route traffic from either photodiode or from 270 to low-speed Rx | OD, lane 0 AND OD, lane 1 AND 270's UART Tx | 1 | 0 0 | 0 |
| Route traffic from 270 to low-speed Rx | 270's UART Tx | 0 | 1 0 | 0 |
| Transmit over low-speed Rx | UART 2 Tx | 0 | 0 1 | 0 |
| Hold low-speed Rx low | 0 | 0 | 0 0 | 0 |
| Hold low-speed Rx high | 1 | X | X X | 1 |

The control circuit 218' and the Ctrl_0, Ctrl_1, and Ctrl_2 pins operate in the same manner with respect to the transmit path as described in the embodiment depicted in FIG. 5 and listed in Table 3. The Ctrl_3 pin driven high to route, to the low-speed Rx line, the low-speed Rx signals on OD, lane 0 and OD, lane 1, and the additional microcontroller's 270 UART Tx. Driving the Ctrl_3 low removes OD, lane 0 and OD, lane 1 from the low-speed Rx line, while the Ctrl_4 and Ctrl_5 pins are driven to route either UART Tx from the additional microcontroller 270 or UART 2 Tx to the low-speed Rx line. Driving each of Ctrl_3, Ctrl_4, Ctrl_5 and Ctrl_6 pins low holds the low-speed Rx line low, while driving Ctrl_6 pin high holds the low-speed Rx line high (e.g., during sleep mode operation if the state of the communications link requires it).

It should now be understood that embodiments described herein are directed to optical engines and optical cable assemblies capable of transmitting and receiving low-speed signals (e.g., control signals or management signals) over optical fibers in addition to relatively high-speed payload data signals without additional transmission medium, and without receiving and resending the low-speed signals. Embodiments described herein apply to any protocol where management/control and high-speed payload data do not overlap in time. Other possible implementations include optical interconnects cables where the optical engine is located inside the host or device instead of inside the ends of the cable.

For the purposes of describing and defining the subject matter of the disclosure it is noted that the term "substantially" is utilized herein to represent the inherent degree of uncertainty that may be attributed to any quantitative comparison, value, measurement, or other representation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the embodiments disclosed herein should be construed to include everything within the scope of the appended claims and their equivalents.

What is claimed is:

1. An optical engine comprising:
    a low-speed Tx line;
    a low-speed Rx line, wherein a low-speed Tx signal is transmitted on the low-speed Tx line and a low-speed Rx signal is received on the low-speed Rx line;
    a high-speed data lane comprising a high-speed Tx lane and a high-speed Rx lane, wherein:
        a high-speed Tx signal is transmitted as an electrical signal on the high-speed Tx lane, and a high-speed Rx signal is received as an electrical signal on the high-speed Rx lane; and
        the high-speed Tx signal and the high-speed Rx signal are transmitted and received at a higher data transfer rate than the low-speed Tx signal and the low-speed Rx signal;
    an optical transceiver device comprising an optical Tx lane and an optical Rx lane, wherein the high-speed data lane is coupled to the optical transceiver device such that high-speed Tx signal present on the high-speed Tx lane is converted to a high-speed optical signal at the optical Tx lane, and a high-speed optical signal received at the optical Rx lane is converted to a high-speed Rx signal that is provided to the high-speed Rx lane; and
    a control circuit positioned between the low-speed Tx line and the low-speed Rx line and the optical transceiver device, wherein the control circuit is electrically coupled to the optical transceiver device and is configured such that the control circuit selectively routes the low-speed Tx signal at the low-speed Tx line directly to the optical transceiver device in real time such that the optical transceiver device converts the low-speed Tx signal to a low-speed optical Tx signal at the optical Tx lane.

2. The optical engine of claim 1, wherein:
    the optical transceiver device receives a low-speed optical Rx signal at the optical Rx lane, and converts the low-speed optical Rx signal to the low-speed Rx signal; and
    the control circuit routes the low-speed Rx signal to the low-speed Rx line.

3. The optical engine of claim 2, wherein the control circuit is configured to selectively route an on-board signal to the low-speed Rx line.

4. The optical engine of claim 2, wherein the control circuit is configured to selectively route an on-board signal to the optical transceiver device.

5. The optical engine of claim 2, wherein the low-speed Tx line, the low-speed Rx line, and the high-speed data lane are configured to be coupled to an electronic device.

6. The optical engine of claim 2, wherein:
    the optical engine further comprises a second high-speed data lane comprising a second high-speed Tx lane and a second high-speed Rx lane; and
    the optical transceiver device further comprises:
        a second optical Tx lane and a second optical Rx lane;
        a first laser control pin operable to control a first laser configured to provide light on the optical Tx lane;
        a second laser control pin operable to control a second laser configured to provide light on the second optical Tx lane;
        a first optical detect pin operable to provide an indication as to light detected at the optical Rx lane; and
        a second optical detect pin operable to provide an indication as to light detected at the second optical Rx lane.

7. The optical engine of claim 6, wherein the control circuit is such that the first laser control pin and the second laser control pin keep the first laser and the second laser in an ON state except for during a sleep mode operation or during transmission of a low-speed Tx signal on the transmit optical lane or the second optical Tx lane.

8. The optical engine of claim 6, wherein:
    the control circuit selectively routes the low-speed Tx signal on the low-speed Tx line directly to the first laser control pin or the second laser control pin of the optical transceiver device; and
    the optical transceiver device receives a first low-speed optical Rx signal at the optical Rx lane as indicated by the first optical detect pin and/or a second low-speed optical Rx signal at the second optical Rx lane as indicated by the second optical detect pin, and converts the first low-speed optical Rx signal to a first low-speed Rx signal and/or the second low-speed optical Rx signal to a second low-speed Rx signal;
    the first low-speed Rx signal and/or the second low-speed Rx signal are electrical signals; and
    the control circuit selectively routes the first low-speed Rx signal or the second low-speed Rx signal to the low-speed Rx line.

9. The optical engine of claim 6, wherein:
    the control circuit comprises a microcontroller, the microcontroller comprising:
        a first serial transmit pin configured to provide a first on-board Tx signal;
        a first serial receive pin coupled to the low-speed Tx line;
        a second serial transmit pin configured to provide a second on-board Tx signal; and
        a second serial receive pin electrically coupled to the first optical detect pin or the second optical detect pin;
    the control circuit is configured to selectively route the first on-board Tx signal to the first laser control pin or the second laser control pin; and
    the control circuit is configured to selectively route the second on-board Tx signal to the low-speed Rx line.

10. The optical engine of claim 9, wherein:
    the control circuit comprises a second microcontroller, the second microcontroller comprising:
        a third serial transmit pin configured to provide a third on-board Tx signal; and
        a third serial receive pin;
    the control circuit is configured to selectively allow the second microcontroller to receive the low-speed Tx signal on the low-speed Tx line; and
    the control circuit is configured to selectively provide the third on-board Tx signal on the low-speed Rx line.

11. The optical engine of claim 10, wherein the second microcontroller is integrated into a signal conditioning integrated circuit.

12. The optical engine of claim 9, wherein the control circuit comprises at least one multiplexer to selectively route the first on-board Tx signal or the low-speed Tx signal to the first laser control pin or the second laser control pin.

13. An optical engine comprising:
a low-speed Tx line;
a low-speed Rx line, wherein a low-speed Tx signal is transmitted on the low-speed Tx line and a low-speed Rx signal is received on the low-speed Rx line;
a high-speed data lane comprising a high-speed Tx lane and a high-speed Rx lane, wherein:
a high-speed Tx signal is transmitted as an electrical signal on the high-speed Tx lane, and a high-speed Rx signal is received as an electrical signal on the high-speed Rx lane; and
the high-speed Tx signal and the high-speed Rx signal are transmitted and received at a higher data transfer rate than the low-speed Tx signal and the low-speed Rx signal;
an optical transceiver device comprising an optical Tx lane and an optical Rx lane, wherein the high-speed data lane is coupled to the optical transceiver device such that high-speed Tx signal present on the high-speed Tx lane is converted to a high-speed optical signal at the optical Tx lane, and a high-speed optical signal received at the optical Rx lane is converted to a high-speed Tx signal that is provided to the high-speed Rx lane; and
means for selectively routing the low-speed Tx signal at the low-speed Tx line directly to the optical transceiver device in real time.

14. The optical engine of claim 13, wherein:
the optical transceiver device receives a low-speed optical Rx signal at the optical Rx lane, and converts the low-speed optical Rx signal to the low-speed Rx signal; and
the optical engine further comprises means for routing the low-speed Rx signal to the low-speed Rx line.

15. The optical engine of claim 14, further comprising means for selectively routing an on-board signal to the low-speed Rx line.

16. The optical engine of claim 14, further comprising:
means for selectively routing an on-board signal to the optical transceiver device; and
mean for selectively routing an on-board signal to the low-speed Rx line.

17. The optical engine of claim 14, wherein:
the optical engine further comprises a second high-speed data lane comprising a second high-speed Tx lane and a second high-speed Rx lane; and
the optical transceiver device further comprises:
a second optical Tx lane and a second optical Rx lane;
a first laser control pin operable to control a first laser configured to provide light on the optical Tx lane;
a second laser control pin operable to control a second laser configured to provide light on the second optical Tx lane;
a first optical detect pin operable to provide an indication as to light detected at the optical Rx lane; and
a second optical detect pin operable to provide an indication as to light detected at the second optical Rx lane.

18. The optical engine of claim 17, further comprising means for maintaining the first laser control pin and the second laser control pin such that the first laser and the second laser always operate in an ON state except for during a sleep mode operation or during transmission of a low-speed Tx signal on the transmit optical lane or the second optical Tx lane.

19. The optical engine of claim 17, further comprising:
means for selectively routing a first on-board Tx signal to the first laser control pin or the second laser control pin; and
means for selectively routing a second on-board Tx signal to the low-speed Rx line.

20. The optical engine of claim 19, further comprising means for routing a third on-board Tx signal and a third on-board Rx signal.

21. An optical cable assembly comprising:
an optical cable having a first end and a second end, the optical cable comprising a plurality of optical fibers;
a first electrical connector assembly disposed at the first end of the optical cable and a second electrical connector assembly disposed at the second end of the optical cable, each of the first electrical connector assembly and the second electrical connector assembly comprising a housing and an optical engine disposed within the housing, the optical engine comprising:
a low-speed Tx line;
a low-speed Rx line, wherein a low-speed Tx signal is transmitted on the low-speed Tx line and a low-speed Rx signal is received on the low-speed Rx line;
a high-speed data lane comprising a high-speed Tx lane and a high-speed Rx lane, wherein:
a high-speed Tx signal is transmitted as an electrical signal on the high-speed Tx lane, and a high-speed Rx signal is received as an electrical signal on the high-speed Rx lane; and
the high-speed Tx signal and the high-speed Rx signal are transmitted and received at a higher data transfer rate than the low-speed Tx signal and the low-speed Rx signal;
an optical transceiver device comprising an optical Tx lane optically coupled to an individual one of the plurality of optical fibers and an optical Rx lane coupled to an individual one of the plurality of optical fibers, wherein the high-speed data lane is coupled to the optical transceiver device such that high-speed Tx signal present on the high-speed Tx lane is converted to a high-speed optical signal at the optical Tx lane, and a high-speed optical signal received at the optical Rx lane is converted to a high-speed Rx signal that is provided to the high-speed Rx lane; and
a control circuit positioned between the low-speed Tx line and the low-speed Rx line and the optical transceiver device, wherein the control circuit is electrically coupled to the optical transceiver device and is configured such that the control circuit selectively routes the low-speed Tx signal at the low-speed Tx line directly to the optical transceiver device in real time such that the optical transceiver device converts the low-speed Tx signal to a low-speed optical Tx signal at the optical Tx lane.

22. The optical cable assembly of claim 21, wherein:
the optical transceiver device receives a low-speed optical Rx signal at the optical Rx lane, and converts the low-speed optical Rx signal to the low-speed Rx signal; and
the control circuit routes the low-speed Rx signal to the low-speed Rx line.

23. The optical cable of claim 22, wherein the control circuit is configured to selectively route an on-board signal to the low-speed Rx line or to the optical transceiver device.

24. The optical cable of claim 22, wherein:
the optical engine further comprises a second high-speed data lane comprising a second high-speed Tx lane and a second high-speed Rx lane; and the optical transceiver device further comprises:
- a second optical Tx lane and a second optical Rx lane;
- a first laser control pin operable to control a first laser configured to provide light on the optical Tx lane;
- a second laser control pin operable to control a second laser configured to provide light on the second optical Tx lane;
- a first optical detect pin operable to provide an indication as to light detected at the optical Rx lane; and
- a second optical detect pin operable to provide an indication as to light detected at the second optical Rx lane.

25. The optical cable of claim 24, wherein:
the control circuit comprises a microcontroller, the microcontroller comprising:
- a first serial transmit pin configured to provide a first on-board Tx signal;
- a first serial receive pin coupled to the low-speed Tx line;
- a second serial transmit pin configured to provide a second on-board Tx signal; and
- a second serial receive pin electrically coupled to the first optical detect pin or the second optical detect pin;

the control circuit is configured to selectively route the first on-board Tx signal to the first laser control pin or the second laser control pin; and
the control circuit is configured to selectively route the second on-board Tx signal to the low-speed Rx line.

* * * * *